United States Patent
Salzmann et al.

(10) Patent No.: US 11,512,664 B2
(45) Date of Patent: Nov. 29, 2022

(54) CYLINDER HEAD GASKET WITH ONE CARRIER LAYER AND AT LEAST ONE INSERT

(71) Applicant: Reinz-Dichtungs-GmbH, Neu-Ulm (DE)

(72) Inventors: Jochen Salzmann, Neu-Ulm (DE); Paul Achatz, Pfaffenhofen (DE); Corney Schlegel, Ulm (DE); Matthias Stauch, Laichingen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 151 days.

(21) Appl. No.: 17/012,693

(22) Filed: Sep. 4, 2020

(65) Prior Publication Data

US 2021/0071618 A1    Mar. 11, 2021

(30) Foreign Application Priority Data

Sep. 6, 2019    (DE) .......................... 202019104931.6

(51) Int. Cl.
| | |
|---|---|
| *F02F 11/00* | (2006.01) |
| *B32B 7/022* | (2019.01) |
| *B32B 3/30* | (2006.01) |
| *B32B 7/12* | (2006.01) |
| *B32B 15/01* | (2006.01) |
| *F16J 15/08* | (2006.01) |
| *F16J 15/10* | (2006.01) |
| *F16J 15/12* | (2006.01) |
| *F16J 15/00* | (2006.01) |

(52) U.S. Cl.
CPC .............. *F02F 11/002* (2013.01); *B32B 3/30* (2013.01); *B32B 7/022* (2019.01); *B32B 7/12* (2013.01); *B32B 15/01* (2013.01); *F16J 15/0818* (2013.01); *F16J 15/102* (2013.01); *F16J 15/123* (2013.01); *B32B 2255/06* (2013.01); *B32B 2255/26* (2013.01); *B32B 2581/00* (2013.01); *F16J 15/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,565,449 | A * | 2/1971 | Brockhaus | ............... F16J 15/12 |
| | | | | 277/601 |
| 4,856,796 | A * | 8/1989 | Genin | ...................... F16J 15/12 |
| | | | | 277/598 |

(Continued)

*Primary Examiner* — Kurt Philip Liethen
(74) *Attorney, Agent, or Firm* — McCoy Russell LLP

(57) ABSTRACT

A cylinder head gasket with a carrier layer and at least one inserted sealing element, wherein the inserted sealing element has a passage opening for combustion gas, the inserted sealing element is fastened on the carrier layer on an outer side which is spaced apart from the passage opening, and the inserted sealing element has at least a first layer and at least one further layer. An engine component comprising the cylinder head gasket is disclosed, the engine component having an engine block unit, a cylinder sleeve unit which delimits the engine block unit at least in regions from a combustion chamber, and a cylinder head unit, wherein the cylinder head gasket is arranged between the cylinder head unit on one hand and the engine block unit and the cylinder sleeve unit on the other hand.

23 Claims, 4 Drawing Sheets

(56) References Cited

U.S. PATENT DOCUMENTS

| | | | | |
|---|---|---|---|---|
| 5,039,117 A | * | 8/1991 | Gohrlich | F16J 15/123 277/591 |
| 5,873,578 A | * | 2/1999 | Jargeaix | F16J 15/123 277/600 |
| 6,485,028 B1 | * | 11/2002 | Smith | F02F 11/002 277/630 |
| 6,702,297 B2 | * | 3/2004 | Furuta | F16J 15/0825 277/592 |
| 6,758,479 B2 | * | 7/2004 | Miyaoh | F16J 15/0818 277/592 |
| 7,377,520 B2 | * | 5/2008 | Imai | F16J 15/0825 277/593 |
| 7,806,415 B2 | * | 10/2010 | Diez | F16J 15/0818 277/593 |
| 8,695,986 B2 | * | 4/2014 | Clemons | F16J 15/0825 277/592 |
| 2007/0090609 A1 | * | 4/2007 | Kasuya | F16J 15/0831 277/598 |
| 2009/0200751 A1 | * | 8/2009 | Widmann | F16J 15/123 277/592 |
| 2010/0109256 A1 | * | 5/2010 | Goettler | F16J 15/0818 277/592 |
| 2021/0071618 A1 | * | 3/2021 | Salzman | B32B 15/01 |

* cited by examiner

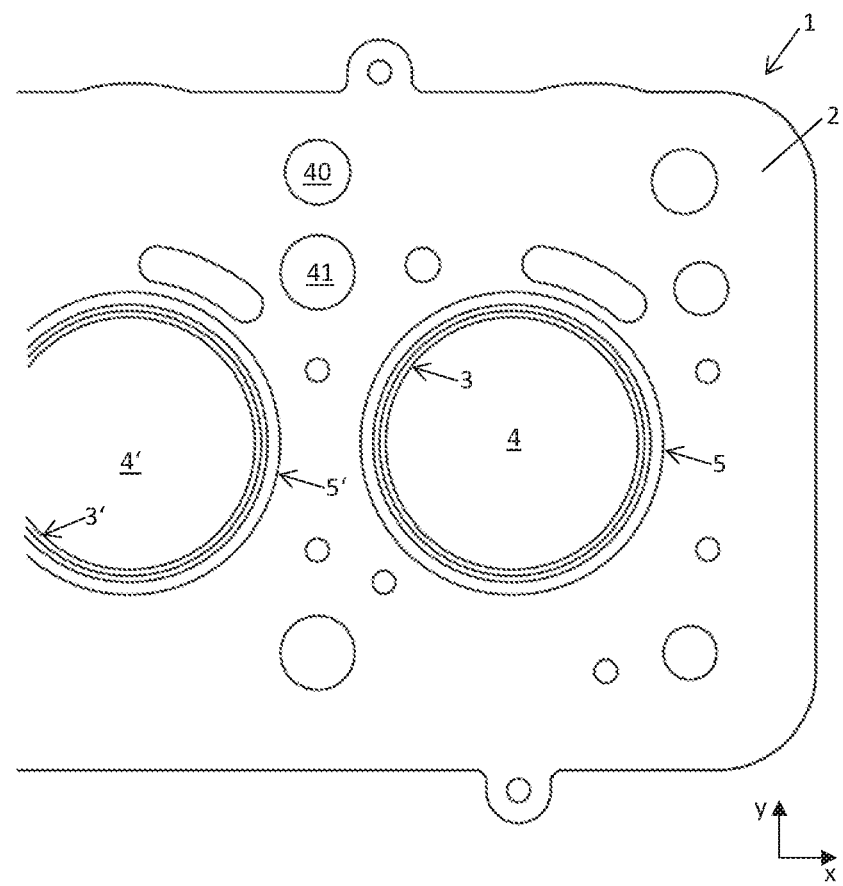
Fig. 1
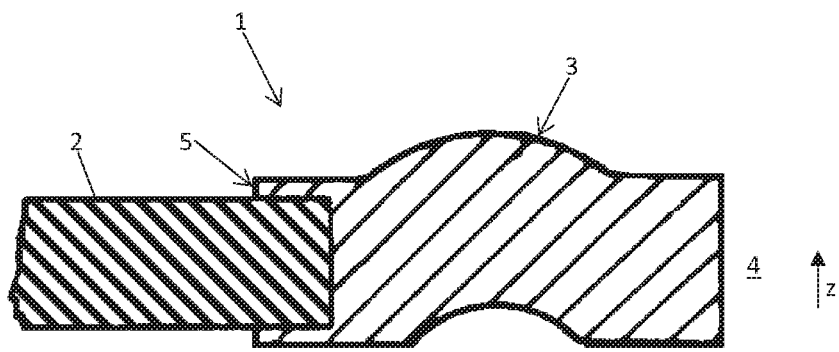
Fig. 2 - Prior Art

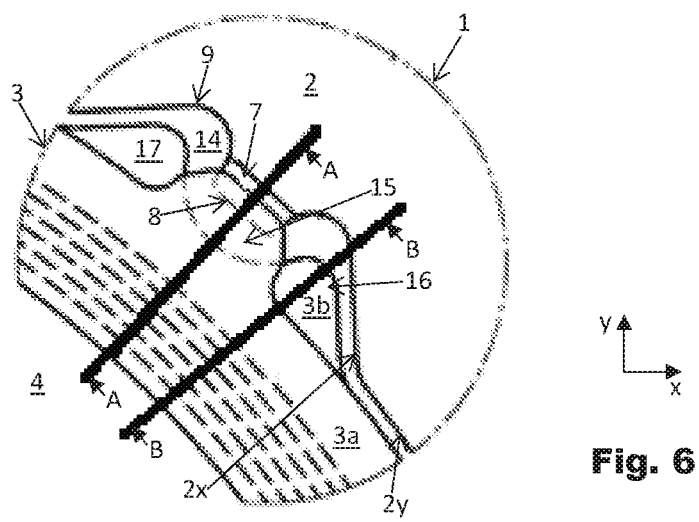
Fig. 6
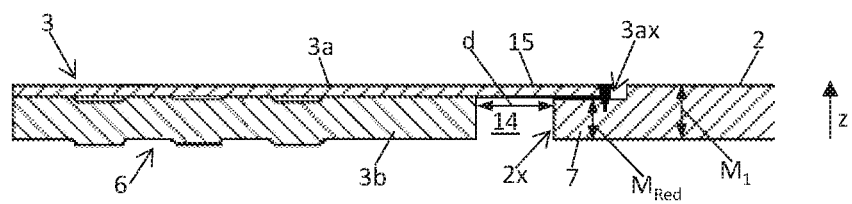
Fig. 7 (A-A)
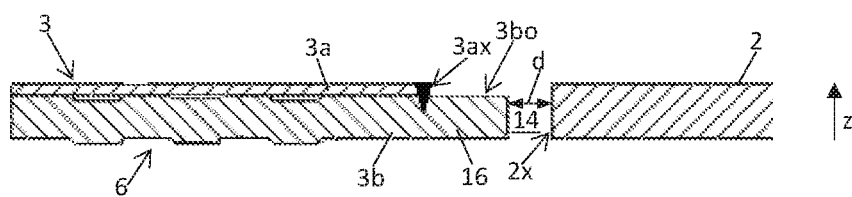
Fig. 8 (B-B)

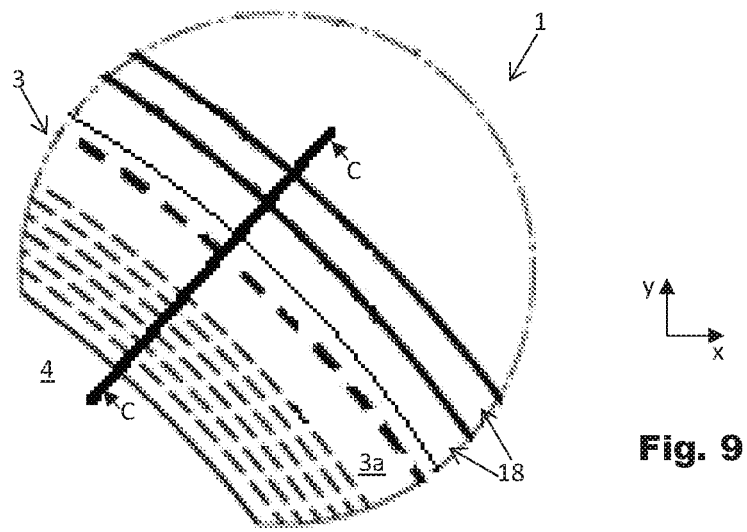
Fig. 9
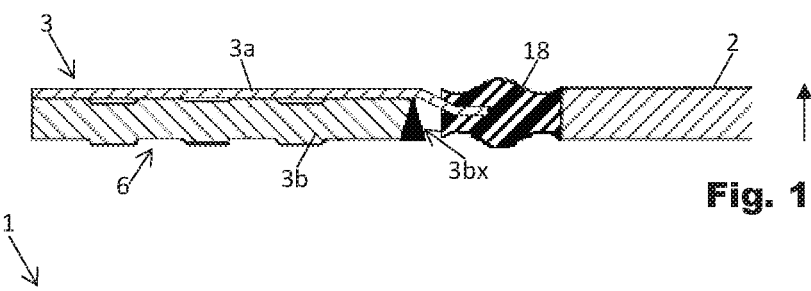
Fig. 10 (C-C)
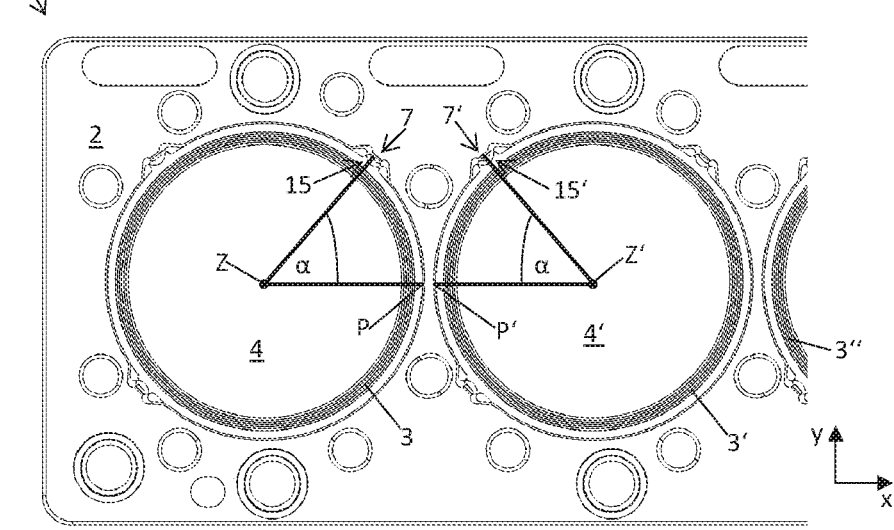
Fig. 11

CYLINDER HEAD GASKET WITH ONE CARRIER LAYER AND AT LEAST ONE INSERT

CROSS-REFERENCE TO RELATED APPLICATION

The present application claims priority to German Utility Model Application No. 20 2019 104 931.6, entitled "CYLINDER HEAD GASKET WITH ONE CARRIER LAYER AND AT LEAST ONE INSERT", and filed on Sep. 6, 2019. The entire contents of the above-listed application is hereby incorporated by reference for all purposes.

TECHNICAL FIELD

The present disclosure relates to a cylinder head gasket with a carrier layer and at least one inserted sealing element, wherein the inserted sealing element has a passage opening for combustion gas and is fastened on the carrier layer on an outer side which is spaced apart from the passage opening, and also has at least a first layer and at least one further layer.

BACKGROUND AND SUMMARY

Cylinder head gaskets for internal combustion engines which are of multilayer design, that is to say have a plurality of carrier and/or sealing layers, are generally known from the prior art. One-layer cylinder head gaskets which have only one carrier and/or sealing layer are also known from the commercial vehicle sector for particularly large-volume engines. With the multilayer cylinder head gaskets, the use of inserted sealing elements, what are called inserts, is costly, and the height matching and joining between carrier layers and inserts is difficult. Moreover, an increased material requirement has to be reckoned with for the multilayer cylinder head gaskets. With one-layer cylinder head gaskets, owing to the lack of a protective layer the embossed structures of the one layer carve themselves into the cylinder head and/or into the engine block, which likewise causes technical problems.

The object of the present disclosure is thus to provide a cylinder head gasket which overcomes the disadvantages mentioned.

This object is addressed by the subject-matter of the present disclosure. Advantageous embodiments are described in the following description and drawings.

One aspect of the present disclosure relates to a cylinder head gasket with exactly one carrier layer and at least one inserted sealing element, i.e. one or more inserted sealing elements. The inserted sealing elements may also be called inserts. In this case, the inserted sealing element has a preferably circular passage opening for combustion gas. Moreover, the inserted sealing element is fastened on the carrier layer on an outer side which is spaced apart from the passage opening. The outer side of the inserted sealing element may comprise an outer edge. The outer edge in turn may be arranged opposite an inner edge of the inserted sealing element which delimits the passage opening. The passage opening may accordingly be formed by the inner edge and/or inner side of the inserted sealing element. The inner side and outer side are then spaced apart, that is to say they are at a distance of >0 from each other. The distance may in this case be measured in a plane running parallel to the main plane of extent of the cylinder head gasket. The main plane of extent may be understood here with respect to the carrier layer as being the neutral axis thereof. The inserted sealing element in this case has at least a first layer and at least one further layer, i.e. is a multilayer inserted sealing element. Overall, thus a one-layer "backland" with a multilayer combustion chamber sealing means is realised.

This has the advantage that both plastically and elastically deformable beads can be implemented for the combustion chamber sealing means, with a plain metal sheet being able to be used here as the first (protective) layer of the inserted sealing element. Due to the one-layer backland, the inserted sealing element can also be joined to the carrier layer with low technical outlay, for example by moulding-on an elastomer or by welding-on. Compared with known designs for combustion chamber sealing means, greater flexibility in forming the combustion chamber sealing means is thus yielded. A one-layer backland may in this case be understood both as a one-piece backland with moulded-in or embossed sealing elements and also as a backland with one-layer inserted sealing elements in one, several or all the fluid openings of the backland, with the inserted sealing elements optionally possibly being provided with elastomeric sealing elements.

In one advantageous embodiment, provision is made for the first layer to be a plain metal sheet layer, in particular for all the first layers to be plain metal sheet layers. This has the advantage that plastically or elastically deformable beads in the further layer do not cause any, or cause fewer, embeddings in the cylinder head and/or engine block.

In a further advantageous embodiment, provision is made for the plain metal sheet layer and the further layer to be welded together. For example, the layers may be welded together on an edge of the plain metal sheet layer and/or an edge of the further layer. In particular, the edge of one of the layers is welded to an upper and/or lower surface of the other layer. In this case, an edge here is in particular not understood to be a surface but a side face which may extend in the corresponding dimension over the sheet thickness of the respective metal sheet. A surface running parallel or substantially parallel to the main plane of extent of the respective layer can be termed an upper or lower surface of a respective layer. Typically, a layer has an upper and a lower surface which are separated from each other by an edge.

This has the advantage that the two layers are held against each other particularly reliably, and the reliable, exactly controllable joining of the two layers precisely when welding can be obtained via at least one edge by way of laser welding. The two layers can thus also be positioned particularly exactly relative to each other. In particular, when welding a layer of the inserted sealing element by way of its edge onto a face of the other layer of the inserted sealing element, the edge or a portion of the edge can be used to orient the laser beam.

The further layer may be a non-plain (uneven) or embossed sealing layer: in particular, provision may be made for all the further layers to be non-plain or embossed sealing layers. Likewise, it is possible for a plurality of plain metal sheet layers to be combined with one or more embossed sealing layers, for example for one embossed sealing layer to be arranged between two plain metal sheet layers.

In one advantageous embodiment, provision is made for exactly one layer of the inserted sealing element to be welded to the carrier layer, in particular on an edge of the exactly one layer and/or on an edge of the carrier layer. The welding of the edge advantageously takes place on a (sur)face of the respective other layer. This has the advantage, precisely in conjunction with the last-named advantageous embodiment, that the different layers of the cylinder head gasket can be joined together simply and reliably with a uniform production process. Due to the welding of exactly one layer of the inserted sealing element on the carrier layer, distortions of the different layers relative to each other are also reduced or prevented.

In this case, provision may be made for the first layer of the inserted sealing element, i.e. preferably the plain metal sheet layer, to be welded to the carrier layer. This is independent of the number of layers of the inserted sealing element: the plain metal sheet layer may be welded to the carrier layer in the case of a two-layered, three-layered or multilayer inserted sealing element as well. In such case, stresses which result from deformation of the layer are particularly effectively prevented from having an adverse effect on the joining of the inserted sealing element and carrier layer, and hence on the entire component. Likewise, it is possible, in the case of an inserted sealing element with at least three layers, for a middle layer of the inserted sealing element to be welded to the carrier layer.

In a further advantageous embodiment, provision is made for the inserted sealing element to be fastened on the carrier layer with an elastomer. In this case, the elastomer may preferably be or become fastened on the carrier layer in an injection-moulding process. For example, the plain metal sheet layer may be embedded with the carrier layer. Preferably elastomers with a working temperature of ≥120° C. are considered here as elastomers. The elastomer is or contains preferably one or more fluororubbers (FKM), and/or hydrogenated nitrile butyl rubbers (HNBR), and/or ethylene propylene diene rubbers (EPDM), and/or acrylonitrile butadiene rubbers (NBR), and/or butyl rubbers (IIR), and/or chlorosulphonated polyethylene rubbers (CSM), and/or ethylene acrylate rubbers (AEM), and/or fluoroalkyl silicones (FMQ), and/or fluorovinyl methyl silicones (FVMQ), and/or perfluororubbers (FFKM), and/or phenyl silicones (PMQ), and/or phenyl vinyl silicones (PVMQ), and/or polyacrylate rubbers (ACM), and/or vinyl methyl silicones (VMQ).

In this case, it is advantageous in production terms if the moulding-on takes place circumferentially (all round).

Fastening of the inserted sealing element on the carrier layer by a material-formed bond, be it by means of welding or by means of moulding-on, has the advantage over insertion of an inserted sealing element into recesses in a gasket holder that the inserted sealing element is not only protected against twisting or slipping in the plane, but is fixed in a certain plane relative to the main plane of extent of the carrier layer. Fastening the inserted sealing element on the carrier layer by a material-formed bond, thus an adhesive bond, moreover makes it possible to mount the entire gasket at lesser cost than if the at least one inserted sealing element has to be inserted into a carrier layer which is pre-mounted at its point of use.

Accordingly, in one advantageous embodiment, provision is made for the inserted sealing element, in particular exactly one layer of the inserted sealing element, to be fastened on the carrier layer by a material-formed bond and/or in a form-fit (with the carrier layer or a part of the carrier layer). The exactly one layer of the inserted sealing element may be the first layer, preferably therefore the plain metal sheet layer.

In a further advantageous embodiment, provision is made for the distance between the further layer and carrier layer to be >0 everywhere. Accordingly, the further layer and carrier layer are then not welded together or otherwise joined, since they are joined together only indirectly, in particular exclusively by way of the first layer. This has the advantage that freedom of movement for a cylinder sleeve, which typically exists between the engine block and cylinder sleeve, can be continued in the region of the cylinder head gasket as well. This improves the sealing behaviour of the cylinder head gasket in changing temperature conditions and with changing effective bolt forces.

In a further advantageous embodiment, provision is made for the carrier layer, in a plane running parallel to the main plane of extent of the cylinder head gasket, to have at least one nose pointing in the direction of the closest passage opening in each case of the inserted sealing element, preferably two or three noses, on which the inserted sealing element is fastened. The noses may also be referred to as protrusions. Preferably the noses or protrusions are formed exclusively in the aforementioned plane, for example therefore cut out from the carrier layer. The noses or protrusions may also be regarded as a tapering partial face of the carrier layer. Advantageously, the first layer is welded on the respective nose on an edge on a two-dimensional partial region of the carrier layer. In this case, the two-dimensional partial region of the carrier layer is different from the edge which runs at least partially perpendicularly to the main plane of extent of the carrier layer. This has the advantage that the inserted sealing element can be adjusted in a particularly simple manner in the carrier layer and be fastened thereto.

In this case, provision may be made for the carrier layer in the region of a free end of the at least one nose to have a lesser material thickness $M_{Red}$ than the material thickness $M_1$ in at least one region of the carrier layer adjoining the nose and farther from the passage opening. This has the advantage that the inserted sealing element protrudes less out of the main plane of extent of the cylinder head gasket, so that the inserted sealing element can be formed more freely, which in turn has an advantageous effect on the contact behaviour of the cylinder head gasket in the installed state and hence the sealing behaviour.

In particular, provision may be made in this case for the reduction in the metal sheet thickness or material thickness of the carrier layer $M_1$-$M_{Red}$ to be greater than the material thickness of the first layer, which is preferably a plain metal sheet layer. As a result, the advantages mentioned in the last paragraph are intensified.

In a particularly preferred manner, here the nose can be arranged in a region of the carrier layer in which the inner edge of the carrier layer relative to the rest of the circumambient inner edge, which can for example run on a circle, in the main plane of extent is set back, i.e. expands radially outwards and thus in portions intersects a plurality of virtual circles of greater circle radius. This yields the advantage that the nose and also the mating parts (noses and/or protrusions) mentioned further below on the inserted sealing element can be made larger without adversely affecting the sealing performance, which facilitates manufacturing, in particular the separate welding of the different layers in one manufacturing step.

In a further advantageous embodiment, provision is made for the inserted sealing element to be fastened on the carrier layer exclusively on the at least one nose of the carrier layer, i.e. on the nose or noses of the carrier layer. This has the advantage that the inserted sealing element is largely detached from the carrier layer, and thus it is possible in a simple manner for the inserted sealing element to be able to lie only on a cylinder sleeve, and not on an engine case surrounding the sleeve, which has an advantageous effect on the sealing action.

In another embodiment, provision is made for a material thickness measured perpendicularly to the main plane of extent of the cylinder head gasket to be greater for the inserted sealing element than for the carrier layer, in particular thicker by more than 5 percent and/or less than 30 percent thicker. In this case, the total of the material thicknesses of the layers of the inserted sealing element can be regarded as the material thickness of the inserted sealing element, or a total thickness of the inserted sealing element. The total thickness may be greater than the totals of the individual material thicknesses because of for example embossing of the further layer, in particular the moulded-in sealing elements. The material thicknesses in this case are measured in the uncompressed state of the cylinder head gasket. This has the advantage that when compressing the cylinder head gasket, as occurs when mounting a cylinder head on an engine block with a cylinder head gasket therebetween, particularly advantageous compressive forces can be achieved which in turn improve the sealing performance. Advantageously, the at least two layers of the inserted sealing element have in each case a sheet thickness which differs from the sheet thickness of the carrier layer. As a result, using sheets of conventionally obtainable sheet thickness for the inserted sealing element and/or carrier layer, the advantages described can be achieved, namely that the overall material thickness of the inserted sealing element is greater than the sheet thickness of the carrier layer. Alternatively, the different sheet thicknesses may also be combined in such a way that the overall material thickness of the inserted sealing element is substantially identical to the sheet thickness of the carrier layer.

In another advantageous embodiment, provision is made for the further layer to have a sealing element surrounding the passage opening, with a sealing line and/or sealing face running around the passage opening. At the sealing line or sealing face, the contact forces introduced in the installed state are so great that no combustion gas can escape. The sealing element may be moulded or embossed into the further layer here. The sealing element in this case may be any sealing element known from the prior art.

In a further advantageous embodiment, provision is made for the first layer, in a plane running parallel to the main plane of extent of the cylinder head gasket, to have at least one nose pointing away from the closest passage opening in each case of the inserted sealing element, preferably two or three noses, and to be fastened by the nose on the carrier layer, in particular on that nose of the carrier layer which is associated in each case. Preferably therefore the respective associated, for example welded, noses of the carrier layer and first layer, in a projection onto a plane running parallel to the main plane of extent of the cylinder head gasket, overlap. This has the advantage that the inserted sealing element can be applied, for example welded on, on the carrier layer in a technically easy manner, without a sealing action of the inserted sealing element being affected in so doing.

In another advantageous embodiment, provision is made for the further layer, in a plane running parallel to the main plane of extent of the cylinder head gasket, to have at least one protrusion pointing away from the passage opening which is closest in each case of the inserted sealing element, which protrusion, in said plane running parallel to the main plane of extent of the cylinder head gasket, protrudes at least in portions across the first layer, and for the further layer to be welded to the first layer on the protrusion, preferably to an edge of the first layer on a face of the further layer. Thus, the edge of the first layer can be welded on a two-dimensional region of the further layer which is different from the edge of the further layer. The two-dimensional region of the respective layer, which is or becomes welded to an edges of the other layer, may in this case here and in the further embodiments run parallel to the main plane of extent of the cylinder head gasket. This has the advantage that the first layer and further layer can be joined together in a particularly simple and reliable manner.

In this case, provision may be made for the protrusion of the further layer and the nose of the first layer, in a projection onto the main plane of extent of the cylinder head gasket, partially to overlap, with in particular the protrusion, preferably two protrusions per nose, in the projection being arranged in each case partially next to the nose which is associated in each case. As a result, the edge of the first layer comes to lie in portions on two-dimensional regions of the further layer, and conversely the edge of the further layer comes to lie in portions on two-dimensional regions of the first layer. As a result, the two layers can be joined particularly easily and reliably to each other, that is to say be welded together.

Advantageously, the different layers are welded exclusively starting from one side of the cylinder head gasket. Particularly advantageously, in the region of one nose of the carrier layer the respective noses and protrusions are formed such that the first layer and further layer and also the inserted sealing element and carrier layer are welded together continuously or only at a short distance of the weld seams from one side of the cylinder head gasket. A short distance can be specified by an absolute amount, for example as at most 5 mm, or as a relative amount, for example as at most 3/360 of the periphery of the inserted sealing element. This has the advantage that the first layer and further layer can be joined together in a particularly simple and reliable manner.

In a further advantageous embodiment, provision is made for the first layer, preferably the plain metal sheet layer, to be associated on a side of the inserted sealing element which in the installed state of the cylinder head gasket faces a cylinder head unit (a cylinder head). This has the advantage of easier visual inspection of the layer position and/or the layered structure. In addition, embeddings in the cylinder head are at least largely avoided.

In another preferred embodiment, provision is made for the cylinder head gasket to have a plurality of inserted sealing elements which are preferably arranged in a row. This has the advantage that the different inserted sealing elements can react in each case individually to changing contact pressure conditions, so that overall the sealing performance is optimised. As an alternative or in addition, the cylinder head gasket may also have an inserted sealing element which has a plurality of passage openings for combustion gas arranged in a row. Such inserted sealing elements are also referred to as spectacles-like inserted sealing elements.

In one particularly advantageous embodiment, provision is made for an angle which is measured with a centre point of the passage opening of the respective inserted sealing elements as a vertex between one or more point(s) of the shortest distance of the respective inserted sealing element from at least one next-adjacent inserted sealing element and the nose of the carrier layer and/or the nose of the plain layer and/or the protrusion of the further layer to be at least 15°, preferably at least 25° and particularly preferably at least 36°. This has the advantage that in a web region of the carrier layer between respective next-adjacent inserted sealing elements the stability of the carrier layer is increased and the inserted sealing elements are nevertheless held reliably thereon.

When using a plurality of inserted sealing elements in the cylinder head gasket, they may preferably be formed identically, which can be made possible partially first by the features mentioned in the last paragraph. This has production and maintenance advantages. However, the nose patterns, that is to say the arrangement patterns of the noses and configuration of the noses, in the different inserted sealing elements may also be formed to deviate from each other. In particular, the inserted sealing elements which are associated with external cylinders may be formed differently from those of internal cylinders. In this case, in turn the inserted sealing elements of the external cylinders may be identical to each other and the inserted sealing elements of the internal cylinders may be identical to each other. External cylinders in this case are for example the first and the last cylinder in a cylinder bank.

One further aspect of the present disclosure relates to an engine component, for example an engine, with an engine block unit (for example an engine block), a cylinder sleeve unit (for example a cylinder sleeve) which delimits the engine block unit at least in regions from a combustion chamber, and also a cylinder head unit (for example a cylinder head). In this case, a cylinder head gasket according to one of the embodiments described is arranged between the cylinder head unit on one hand and the engine block unit and the cylinder sleeve unit on the other hand.

In this case, provision may be made for a first gap, in particular in the shape of a ring segment, to be present between the engine block unit and cylinder sleeve unit, which gap, at least in regions perpendicularly to the main plane of extent of the cylinder head gasket, continues in a second gap, in particular in the shape of a ring segment, between the carrier layer and inserted sealing element. This has the advantage that a clearance which changes due to changing temperature regimes between the cylinder sleeve unit and engine block unit does not contribute, or contributes less, to stresses within the cylinder head gasket, so that the sealing performance thereof is improved. The afore-mentioned angle specifications with respect to the nose arrangement have a particularly advantageous effect here, since the greatest deformation takes place in the direction from cylinder to cylinder.

In this case, the second gap, measured parallel to the main plane of extent of the cylinder head gasket, at least outside the nose regions and/or protrusion regions of the respective layers, may be larger than the first gap. This has the advantage that it can be ensured that the inserted sealing element in the installed state lies merely on the cylinder sleeve unit and not on the engine block unit, which improves the sealing behaviour.

The features and combinations of features mentioned above in the description and also the features and combinations of features mentioned below in the description of the drawings and/or shown in the drawings alone can be used not only in the combination indicated in each case, but also in other combinations, without departing from the scope of the present disclosure. Thus also embodiments of the present disclosure which are not explicitly shown and discussed in the drawings, but emerge and can be produced by separated combinations of features from the embodiments discussed, are to be regarded as covered and disclosed. In addition, embodiments and combinations of features which thus do not have all the features of an originally formulated independent or dependent claim are to be regarded as disclosed. Furthermore, embodiments and combinations of features, in particular due to the embodiments explained above, which go beyond or depart from the combinations of features explained in the dependencies of the claims are to be regarded as disclosed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way. Examples of embodiments of the present disclosure will be discussed in greater detail below with reference to schematic drawings, in which:

FIG. 1 is a top view of a cylinder head gasket;

FIG. 2 is a sectional view of a detail of a cylinder head gasket of the prior art;

FIG. 6 is a top view of a detail of a fourth exemplified cylinder head gasket in the main plane of extent;

FIG. 7 shows the exemplified cylinder head gasket of FIG. 6 in a sectional view along the section line A-A in the vertical direction;

FIG. 8 shows the exemplified cylinder head gasket of FIG. 6 in a further sectional view along the section line B-B in the vertical direction;

FIG. 9 is a top view of a fifth exemplified cylinder head gasket in the main plane of extent;

FIG. 10 shows the exemplified cylinder head gasket of FIG. 9 in a sectional view along the section line C-C in the vertical direction; and FIG. 11 is a top view of a further exemplified embodiment of a cylinder head gasket.

Identical elements and elements which have the same function are provided with the same reference numerals in the drawings. FIGS. 1 and 4-11 are shown with components within one figure in proportional size with one another, according to some embodiments.

DETAILED DESCRIPTION

Figure 3:
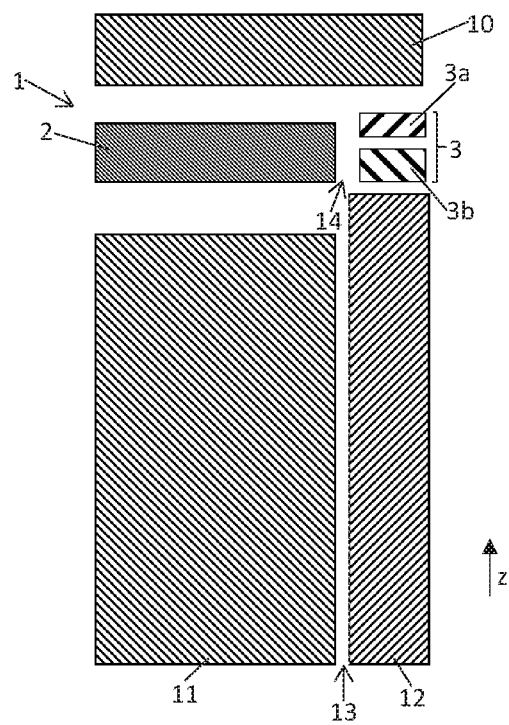
FIG. 3 is a schematic view of a first exemplified cylinder head gasket with inserted sealing element between the cylinder head and also engine block and cylinder sleeve in the uncompressed state.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

FIG. 1 is a top view of a portion of an exemplified cylinder head gasket 1 in its main plane of extent, the x-y plane. The cylinder head gasket 1 in this case has one carrier layer 2 with at least one, in the present portion two, inserted sealing elements 3, 3'. The inserted sealing elements 3, 3' in this case have respective passage openings 4, 4' and are fastened on the carrier layer 2 on an outer side 5, 5' which is spaced apart from the passage opening. A representation of the sealing of the passage openings of the backland, for example of the passage openings 40, 41, has been dispensed with here. Both sealing elements moulded into or embossed into the carrier layer 2 and also one-layer inserted sealing elements which are preferably provided with elastomeric sealing elements may be used.

FIG. 2 now shows a sectional view in a vertical axis, that is to say with a section plane running parallel to the vertical axis z, of a cylinder head gasket 1 as is known from the prior art. Therein, a one-layer inserted sealing element 3 is fastened on the carrier layer 2. For sealing purposes, the inserted sealing element in the present case has a bead which runs all round the passage opening 4.

FIG. 3 illustrates the schematic arrangement of an exemplified cylinder head gasket 1 between a cylinder head unit 10 on one hand and an engine block unit 11 plus cylinder sleeve unit 12 on the other hand in a sectional view in the z direction, i.e. vertical direction. In this case, the arrangement in the present case is shown in the uncompressed state. Between the engine block unit 11 and cylinder sleeve unit 12 in this case a first gap 13 is shown which in the section shown extends in the z direction perpendicularly to the main plane of extent of the cylinder head gasket 1 and continues in a second gap 14 which is present between the carrier layer 2 and inserted sealing element 3 with a first layer 3a and a further layer 3b. Accordingly, the inserted sealing element 3 in the present case is spaced apart from the carrier layer 2 in the main plane of extent, perpendicularly to the z direction at a distance of d>0. In the example shown, the inserted sealing element 3 in the z direction is thicker than the carrier layer 2, i.e. has an increased material thickness compared with the carrier layer 2. This may for example amount to between 105% and 130% of the material thickness of the carrier layer 2. No embossed structures are illustrated in FIG. 3. The greater overall thickness of the inserted sealing element may also be caused by embossed structures, which are not shown here.

Figure 4:
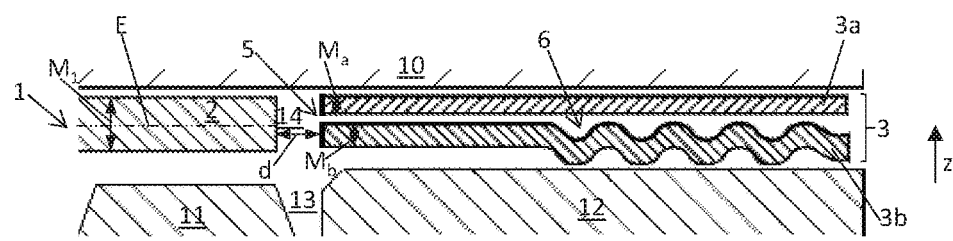
FIG. 4 is a sectional view in the vertical direction of a second exemplified cylinder head gasket.

FIG. 4 shows an exemplified cylinder head gasket 1 in the installed, but uncompressed, state in a sectional view in the vertical direction. Again, the first gap 13 is present between the engine block unit 11 and cylinder sleeve unit 12, which gap continues in the vertical direction in the second gap 14 between the carrier layer 2 and inserted sealing element 3. The distance d between the carrier layer 2 and inserted sealing element 3 is greater than zero, at least in the portion shown, i.e. in portions. The distance may also for the most part be greater than zero, i.e. on a major part of the periphery of the inserted sealing element 3, in particular on more than 65% of the periphery. Since the inserted sealing element in the present case has a first layer 3a, which is embodied as a plain metal sheet layer, and also has a further layer 3b, which is embodied as a sealing layer and has a sealing element 6 embossed into the further layer 3b, the distance d in the embodiment shown may be made variable. Thus for example the distance d between the carrier layer 2 and further layer 3b may be continuously greater than zero all round, but the distance d between the carrier layer 2 and the plain metal sheet layer 3a for the most part may be greater than zero, but shrink to zero at fastening points, since the carrier layer and the plain metal sheet layer are arranged lying against each other there. The thickness of the cylinder head gasket 1 in this case in the region of the carrier layer 2 is specified by the material thickness $M_1$ of the carrier layer 2, in the region of the inserted sealing element 3 by the material thicknesses $M_a$, $M_b$ of the first layer 3a and the further layer 3b, and also additionally in the present case by the configuration of the sealing element 6. Therefore the thickness of the inserted sealing element 3, which in one point of view can be equated with the material thickness of the inserted sealing element 3 as a whole, in the present case is somewhat greater than the total of the two material thicknesses $M_a$ and $M_b$. Owing to the embossings of the further layer 3b, however, from another point of view as well, in which the thicknesses and not only the material thicknesses are used, a considerably greater thickness of the inserted sealing element than of the carrier layer 2 is yielded. Overall, the thickness or material thickness for the inserted sealing element 3 here too is greater than for the carrier layer 2.

Figure 5:
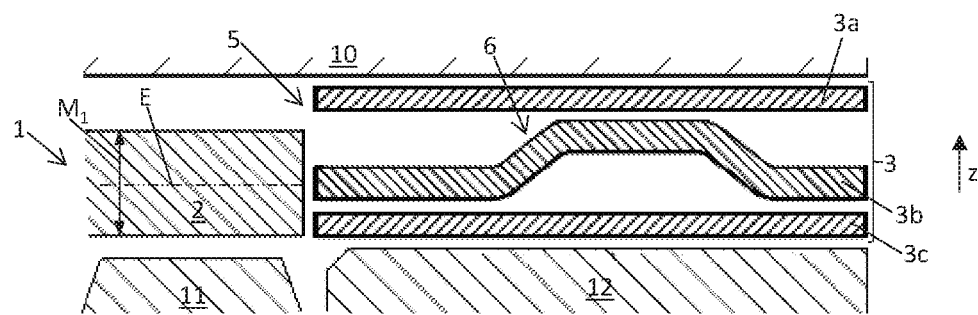
FIG. 5 is a sectional view in the vertical direction of a third exemplified embodiment of a cylinder head gasket.

FIG. 5 shows a sectional view through another exemplified cylinder head gasket 1 in the vertical direction. Unlike the example shown in FIG. 4, the inserted sealing element 3 in the present case comprises three layers 3a, 3b, 3c, the outer two of which are first layers embodied as plain metal sheet layers and the middle layer 3b of which is embodied as a sealing layer with an embossed or moulded-in sealing element 6. Here too, the thickness of the inserted sealing element 3 at least in the uncompressed state is greater than the material thickness $M_1$ of the carrier layer 2 and hence of the thickness of the carrier layer 2. E designates the main plane of extent of the cylinder head gasket 1.

FIG. 6 illustrates a top view of a detail of a further exemplified embodiment of a cylinder head gasket 1. There, the carrier layer 2, in a plane running parallel to the main plane of extent of the cylinder head gasket 1, has a nose 7 pointing in the direction of the passage opening 4 of the inserted sealing element 3, on which nose the inserted sealing element 3 is fastened. In this case, the carrier layer 2 in the region of a free end 8 of the nose 7 has a lesser material thickness $M_{Red}$ than the material thickness $M_1$ in a region adjoining the nose 7. As shown in FIG. 7, the reduction in the material thickness of the carrier layer $M_1 - M_{Red}$ is greater than or equal to the material thickness of the first layer 3a. The nose 7 in this case is also arranged in a region 9 of the carrier layer 2 in which the inner edge 2x of the carrier layer 2 relative to the rest of the circumambient inner edge 2y is set back, i.e. is further distant from a centre point of the passage opening 4 than the rest of the circumambient inner edge 2y.

The inserted sealing element 3 in this case in the present case is also fastened on the carrier layer 2 exclusively on the at least one nose 7 of the carrier layer 2. For this, the first layer 3a in the example shown, in a plane running parallel to the main plane of extent of the cylinder head gasket 1, has at least one nose 15 corresponding to the respective nose 7 and pointing away from the passage opening 4 of the inserted sealing element 3. The first layer 3a is fastened by this nose 15 on the nose 7 of the carrier layer. In this case, the first layer 3a is preferably welded to an (outer) edge 3ax on the upper side of the carrier layer 2, that is to say a face of the carrier layer 2 oriented in the positive z direction. This can be done for example with spot welding or, as in the present example, with a weld seam having a minimum length of for example 3 or 4 mm. In the example shown, thus the first layer 3a comes to rest on the carrier layer 2 and thus in FIG. 6 covers parts of the carrier layer 2, more exactly the free end 8 of the nose 7, which is why said end is then shown in broken lines.

As can be seen in FIGS. 7 and 8, the further layer 3b in turn is arranged under the first layer 3a, viewed in the z direction, so that the outer edge of the further layer 3b in FIGS. 7 and 8 is arranged next to the inner edge of the carrier layer 2. To fasten the further layer, the latter, in a plane running parallel to the main plane of extent of the cylinder head gasket, has at least one, in the present case two, protrusions 16, 17 pointing away from the passage opening of the inserted sealing element 3 which protrude(s) across the first layer 3a. The further layer 3b is then welded to a surface 3bo oriented in the positive z direction with an edge 3ax of the first layer. In this case, in the example shown the protrusions 16, 17 overlap partially with the nose 15 (see FIG. 6). The nose 15 is correspondingly arranged between the two protrusions 16, 17, viewed in the x-y plane. Due to the gap 14, thus the further layer 3b, as also shown in FIGS. 7 and 8, is arranged spaced continuously apart from the carrier layer 2: the distance d between the further layer 3b and carrier layer 2 is therefore greater than zero all round. The first layer 3a on the other hand is partially spaced apart (FIG. 8) and partially arranged in contact with the carrier layer 2 (FIG. 7), i.e. lies in portions on the carrier layer. The further layer 3b is thus arranged on the same side of the first layer 3a on the first layer 3a, on which the carrier layer is also arranged, but can be welded from the same side to both the carrier layer and the further layer. The welding of all three elements can therefore take place continuously in one operation.

FIG. 9 illustrates a detail of another exemplified cylinder head gasket 1. In this one, the further layer 3b is welded on an edge to the first layer 3a, which in turn is fastened with an elastomer 18 on the carrier layer 2. In this case, in the present case the first layer 3a is embedded by injection with the elastomer and the carrier layer 2. The inserted sealing element 3 is thus fastened on the carrier layer 2 continuously all round with exactly one layer, the first layer 3a, which is embodied here as a plain layer, on its outer side remote from the passage opening 4. This is also shown in the corresponding sectional view in the vertical direction in FIG. 10.

FIG. 11 now shows a cylinder head gasket 1 with a plurality of, in the present case at least three, inserted sealing elements 3, 3', 3". The further inserted sealing elements 3, 3', 3" in this case are arranged in a row. The inserted sealing elements in the example shown are constructed identically, which is why it is particularly advantageous that an angle α which is measured with a centre point Z of the passage opening 4 of the respective inserted sealing elements 3 as a vertex between a point P of the shortest distance of the respective inserted sealing element 3 from a next-adjacent inserted sealing element 3' and in the present case the nose 7, the carrier layer 2 and the nose 15 of the first layer 3b in the form of the respective centre points of the corresponding noses 7, 15 is at least 36°.

FIGS. 1 and 3-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' may be used. Unless otherwise specified or described, this language seeks to incorporate at least 10% variability to the specified number or range. That variability may be plus 10% or negative 10% of the particular number specified.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A cylinder head gasket with a carrier layer and at least one inserted sealing element, wherein
 the inserted sealing element has a passage opening for combustion gas;
 the inserted sealing element is fastened on the carrier layer on an outer side which is spaced apart from the passage opening;
 the inserted sealing element has at least a first layer and at least one further layer; and
 exactly one layer of the inserted sealing element is welded to the carrier layer via a weld bead at an interface edge of the exactly one layer and a side edge of the carrier layer.

2. The cylinder head gasket according to claim 1, wherein the first layer of the inserted sealing element is a plain metal sheet layer.

3. The cylinder head gasket according to claim 2, wherein the plain metal sheet layer of the inserted sealing element and the further layer of the inserted sealing element are welded together.

4. The cylinder head gasket according to claim 1, wherein the plain metal sheet layer of the inserted sealing element is welded to the carrier layer and/or, in the case of an inserted sealing element with three layers, a middle layer of the inserted sealing element is welded to the carrier layer.

5. The cylinder head gasket according to claim 1, wherein a distance between the further layer and carrier layer is greater than zero.

6. The cylinder head gasket according to claim 1, wherein the carrier layer, in a plane running parallel to the main plane of extent of the cylinder head gasket, has at least one nose pointing in the direction of the passage opening of the inserted sealing element on which the inserted sealing element is fastened.

7. The cylinder head gasket according to claim 6, wherein the carrier layer, in the region of a free end of the at least one nose, has a lesser material thickness $M_{Red}$ than the material thickness $M_1$ in a region adjoining the nose.

8. The cylinder head gasket according to claim 7, wherein a reduction in the material thickness $M_1$-$M_{Red}$ of the carrier layer is greater than a material thickness $M_a$ of the first layer.

9. The cylinder head gasket according to claim 6, wherein the nose is arranged in a region of the carrier layer in which the inner edge of the carrier layer relative to the rest of the circumambient inner edge is set back.

10. The cylinder head gasket according to claim 6, wherein the inserted sealing element is fastened on the carrier layer exclusively on the at least one nose of the carrier layer.

11. The cylinder head gasket according to claim 1, wherein a material thickness measured perpendicularly to the main plane of extent of the cylinder head gasket is greater for the inserted sealing element than for the carrier layer by more than 5% and/or less than 30% thicker.

12. The cylinder head gasket according to claim 1, wherein the further layer has a sealing element surrounding the passage opening, with the sealing element being moulded into or embossed into the further layer.

13. The cylinder head gasket according to claim 1, wherein the first layer, in a plane running parallel to the main plane of extent of the cylinder head gasket, has at least one nose pointing away from the passage opening of the inserted sealing element, and is fastened on the nose of the carrier layer.

14. The cylinder head gasket according to claim 13, wherein the further layer, in a plane running parallel to the main plane of extent of the cylinder head gasket, has at least one protrusion pointing away from the passage opening of the inserted sealing element, which protrusion protrudes across the first layer, and the further layer is welded to the first layer at the protrusion, with an edge of the first layer on a face of the further layer.

15. The cylinder head gasket according to claim 14, wherein the protrusion of the further layer and the nose of the first layer, in a projection onto the main plane of extent of the cylinder head gasket, partially overlap, with two protrusions per nose, in the projection being arranged in each case partially next to the nose.

16. The cylinder head gasket according to claim 1, wherein the first layer is arranged on a side of the inserted sealing element which in the installed state of the cylinder head gasket faces a cylinder head unit.

17. The cylinder head gasket according to claim 1, wherein the cylinder head gasket has a plurality of inserted sealing elements which are arranged in a row.

18. The cylinder head gasket according to claim 17, wherein an angle which is measured with a centre point of the passage opening of the respective inserted sealing elements as a vertex between a point of the shortest distance of the respective inserted sealing element from a next-adjacent inserted sealing element and the nose of the carrier layer and/or the nose of the first layer and/or the protrusion of the further layer is at least 15°.

19. An engine component, with an engine block unit, a cylinder sleeve unit which delimits the engine block unit at least in regions from a combustion chamber, and a cylinder head unit, wherein a cylinder head gasket according to claim 1 is arranged between the cylinder head unit on one hand and the engine block unit and the cylinder sleeve unit on the other hand.

20. The engine component according to claim 19, wherein a first gap, in particular in the shape of a ring segment, is present between the engine block unit and cylinder sleeve unit, which gap, at least in regions perpendicularly to the main plane of extent of the cylinder head gasket, continues in a second gap in the shape of a ring segment, between the carrier layer and inserted sealing element.

21. The engine component according to claim 20, wherein the second gap, at least outside the nose and/or protrusion regions, is larger than the first gap.

22. A cylinder head gasket with a carrier layer and at least one inserted sealing element, wherein
the inserted sealing element has a passage opening for combustion gas;
the inserted sealing element is fastened on the carrier layer on an outer side which is spaced apart from the passage opening;
the inserted sealing element has at least a first layer and at least one further layer;
the first layer is a plain metal sheet layer;
the plain metal sheet layer and the further layer are welded together;
exactly one layer of the inserted sealing element is welded to the carrier layer at an interface edge of the exactly one layer;
the inserted sealing element is fastened on the carrier layer with an elastomer;
wherein a section of the first layer of the inserted sealing element is embedded in the elastomer and the elastomer is attached to the carrier layer; and
the elastomer containing one or more fluororubbers (FKM), and/or hydrogenated nitrile butyl rubbers (HNBR), and/or ethylene propylene diene rubbers (EPDM), and/or acrylonitrile butadiene rubbers (NBR), and/or butyl rubbers (IIR), and/or chlorosulphonated polyethylene rubbers (CSM), and/or ethylene acrylate rubbers (AEM), and/or fluoroalkyl silicones (FMQ), and/or fluoro vinyl methyl silicones (FVMQ), and/or perfluororubbers (FFKM), and/or phenyl silicones (PMQ), and/or phenyl vinyl silicones (PVMQ), and/or polyacrylate rubbers (ACM), and/or vinyl methyl silicones (VMQ).

23. The cylinder head gasket according to claim 22, wherein the inserted sealing element is fastened on the carrier layer circumferentially on the outer side with exactly one layer of the inserted sealing element.

\* \* \* \* \*